United States Patent Office 2,905,051
Patented Sept. 22, 1959

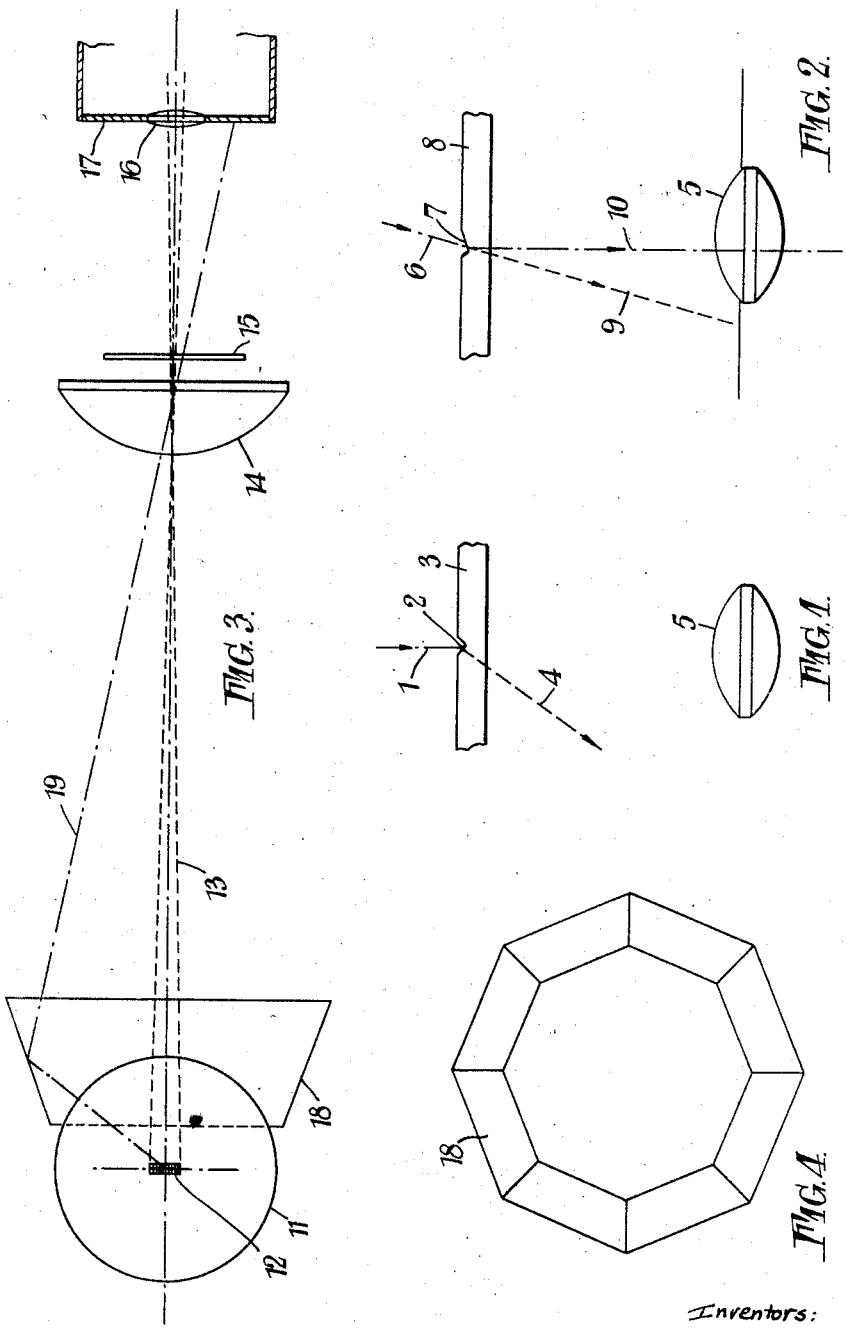

2,905,051

PHOTOGRAPHIC PROJECTION

Geoffrey Bond Harrison and Arthur Philip Jenkins, Ilford, England, assignors to Ilford Limited, Ilford, England, a British company Application March 7, 1955, Serial No. 492,512

Claims priority, application Great Britain March 19, 1954

5 Claims. (Cl. 88—24)

This invention relates to a method of photographic projection from photographic negative or positive transparencies whereby the effect of blemishes on the transparency may be reduced or eliminated in the projected image. It is of particular value in the production of photographic projection prints and will be described in particular relation thereto. The invention further includes apparatus for use in the said method.

For convenience in describing the invention, photographic projection printing apparatus will be referred to simply as an "enlarger" and the method as that of "enlargement," but it is to be understood that the terms are intended to include apparatus and processes giving a print of the same size as the transparency or of larger or smaller dimensions. For convenience also the term "transparency" will be used to include a negative or a positive image either in black and white or in colour.

To illuminate the transparency, enlargers may be provided either with specular illumination or with fully diffuse illumination, but most commonly are provided with illumination of characteristics lying between these extremes. In order to obtain a high degree of sharpness in the print, it is found to be better to use specular illumination, possibly because this provides such an intensity that effectively small lens apertures may be used, or possibly because diffuse light gives rise to more stray light in the system, which tends to reduce contrast, especially between small adjacent areas, and thereby results in an apparent loss of sharpness.

In the formation of colour prints from colour transparencies (which application of the present invention is of especial importance), it is desirable to use specular illumination for the following reasons. A greater illumination can be obtained on the print material for the same power consumption and aperture, thus reducing exposures to a minimum; by reason of the greater possible illumination a smaller aperture can be used, thus affording a greater depth of field, an advantage if the transparencies are not to be mounted between glass; furthermore, a better definition can normally be obtained in the print.

Unfortunately, however, the use of specular illumination results in the reproduction of scratch marks, dust and any other blemishes in the transparency. This may represent a serious disadvantage, especially where in the commercial production of colour prints the original transparencies are provided by the customer; in these circumstances many transparencies bear scratch marks or other blemishes which cannot be removed by cleaning.

The present invention is concerned with a new method and apparatus, of especial value in forming projection prints from transparencies, which reduces the effect of the blemishes referred to above without seriously affecting the definition of the projected image and retains the overall advantages of a specular system, e.g. high intensity of projection light and depth of focus. It may be applied to the production of prints from transparencies carrying images in any relatively non-scattering material, including developed silver, but is of particular value in the production of prints from colour transparencies in which the image is substantially non-scattering and will therefore be described with particular reference to that application.

A colour transparency carries an image in dyestuffs and the image absorbs some of the incident light but scatters very little out of the path of the incident light. Any scratch or dust particle on the transparency will, however, scatter the incident light in all directions so that in an enlarger employing specular illumination much of this scattered light will be lost and the area on the print corresponding to the scratch or dust particle will not be illuminated, or will be illuminated only to a less degree than the adjacent areas of the print. Accordingly, on straight development such areas will appear white and on reversal development will appear black.

According to the present invention a method of reducing or eliminating the effect of scratches, dust particles and other blemishes on a photographic transparency, and particularly a photographic dyed colour transparency, in the production of a projected image, and particularly a projection print therefrom, using an enlarger having specular illumination, comprises providing at least one secondary beam of light arranged to illuminate the transparency but not to pass through the enlarger objective lens unless deviated from its path.

The principle of the method of this invention is illustrated in Figures 1 and 2 and a particular form of apparatus is diagrammatically illustrated in Figures 3 and 4 of the accompanying drawings. In Figure 1 there is diagrammatically illustrated a ray of light 1 from a lamp and condenser lens system, not shown, falling on a scratch 2 in a transparency 3. The effect of the scratch is to deflect the ray, for example in the direction shown by the arrow 4 so that it does not pass through the objective lens 5. Thus, the scratch appears dark when viewed from the position of the objective lens.

In Figure 2 there is diagrammatically illustrated a ray of light 6 falling on a scratch 7 in a transparency 8, the said ray 6 being a secondary beam of light. The normal path of the ray 6 is shown by the arrow 9, and it will be observed that it falls outside the field of the objective lens 5. However, part of the secondary beam will be deflected by the scratch 7 into the objective lens 5, along the path 10. Accordingly, the scratch appears light when viewed from the position of the objective lens.

In the aforesaid method the main part of the secondary beam or beams, since they do not pass through the enlarger objective lens, has no effect on the print. However, in areas of the transparency which have blemishes as aforesaid some rays of the secondary beam or beams of light will be diverted by scattering so that they pass through the enlarger objective lens and will therefore provide light at the print in those areas (corresponding with the blemishes aforesaid) which would not otherwise receive light, or which would receive only a reduced amount of light. The effect is, therefore, that the areas of the print material corresponding to the blemishes receive increased exposure and accordingly the blemishes become less visible or invisible in the final print.

Since in general the light scattered out of the normal path by a scratch or other blemish is greater the smaller the angle from the normal, it is preferred to arrange that the secondary beam or beams of light fall just outside the enlarger objective lens making as small an angle as convenient to the optic axis of the system. By providing a multiplicity of secondary beams of light the amount of light diverted by the blemishes through the enlarger objective lens may be increased so that it may be more or less than is necessary, so that the print is over-corrected or under-corrected in respect of these blemishes. It may therefore be desirable to provide means for controlling the relative intensity of the primary and secondary beams.

The rays of the secondary beams deflected at the blemish will be broadly diffused and will therefore utilise the whole of the objective lens aperture. If, however, it is arranged that the primary beam effectively utilises only a small part of the aperture of the objective lens, then reduction in the aperture of the objective lens will reduce the proportion of the secondary beam of light transmitted by the lens, but will have substantially less effect on the primary beam. This control can be effected by means of a conventional iris diaphragm. Control of the intensity of the primary beam may be effected by inserting in that beam, in a position in which it does not affect the secondary beam or beams, a non-scattering neutral filter. It is, however, generally preferred to set up the apparatus initially so that a just adequate correction is obtained for the average blemishes occurring in the transparencies to be printed, or so that as little correction as possible is necessary, a fine control being effected by means of the iris diaphragm in the objective lens or a neutral density in the primary beam.

A convenient method of carrying out the invention is to provide real or reflected secondary beams of light from several sources in or near the plane of the primary source at right angles to the system and to bring the resulting secondary beams to focus by the condenser lens at points just outside the margin of the enlarger objective lens. The secondary source or sources should preferably provide specular illumination and may conveniently be provided by arranging one or more mirrors imaging the primary source at positions off-centre with respect thereto.

The secondary beam or beams may, however, be provided by separate sources and any system of lenses, prism and planar or non-planar mirrors to provide the required form of illumination.

Thus, for example, there may be provided between the primary source and the condenser and in a ring round the optic axis a plurality of mirrors, e.g. 6, 8 or 10, each similarly inclined to the axis of the system and providing reflected images (constituting secondary sources) of the primary source in a ring round the primary source, the mirrors being arranged so that the beams from them are each focused by the condenser lens approximately at the plane of the enlarger objective lens but outside it. In this way, not only is the effect of the blemishes in the transparency reduced or eliminated but, compared with the use of diffuse illumination, which will also remove or minimise the effect of such blemishes, a better definition is obtained in the print, more light is obtained for the same power consumption, and there is a much greater depth of focus to the system for the same power consumption.

The method of the invention is of greatest value where the image-bearing transparency is itself substantially non-diffusing, e.g. is a dye image or a relatively fine grain silver image, and its effectiveness falls off accordingly as the image is of a more scattering character. Netherthe less, the method affords a useful advantage even when the transparency carries a relatively coarse grain silver image such as is derived from modern high speed photographic emulsions.

The present invention includes projection apparatus comprising means for providing one or more secondary beams of light directed on the image-bearing transparency but not normally passing through the objective lens, and more particularly a system in which one or more inclined mirrors are employed to form such secondary source or sources.

Referring to Figures 3 and 4 of the drawings, a lamp 11 having a filament 12 causes a substantially specular primary beam of light 13 to pass through a condenser lens 14, a transparency 15 and an objective lens 16, this last shown as mounted in a housing 17. A plurality of similarly inclined plane mirrors 18 in the form of a truncated pyramid is located annularly on the axis of the primary beam of light. These mirrors are shown in Figure 4 as they appear looking along the axis of the primary beam 13. A secondary beam of light from the filament 12 falls on the mirrors 18 and is reflected along the path 19 through the condenser lens 14 and transparency 15. It will be observed that the secondary beam passes outside the objective lens 16. However, any secondary beam falling on a scratch or other blemish on the transparency 15 will be deflected so that part of it will pass through the objective lens, thus affording a partial exposure of the projected area of the scratch or other blemish.

What we claim is:

1. Apparatus for optically projecting images of photographic records and the like carried on transparent supports, which comprises an optical projector having a substantially specular source of light, means for locating the said record in the path of a primary beam of light from said source, an objective lens adapted to project an image of said record while undesired light deflecting surface portions of said record deflect said primary beam of light so that no image of said light deflecting surface portions is projected by said objective lens, an optical system including at least one mirror positioned to reflect said substantially specular source of light to constitute a secondary beam of light having a direction to illuminate said record and to pass just outside the aperture of the objective lens, said secondary beam of light being partly deflected by said light deflecting surface portions to pass through said objective lens so that the same projects an image of said light deflecting surface portions, said primary and secondary beams being provided in the absence of diffused illumination.

2. Apparatus for optically projecting images of photographic records and the like carried on transparent supports, which comprises an optical projector having a substantially specular source of light, means for locating the said record in the path of a primary beam of light from said source, an objective lens adapted to project an image of said record while undesired light deflecting surface portions of said record deflect said primary beam of light so that no image of said light deflecting surface portions is projected by said objective lens, a plurality of similarly inclined mirrors arranged annularly of the axis of the primary beam, each providing, by reflection of said substantially specular source of light, a secondary beam of light having a direction to illuminate said record and to pass just outside the aperture of the objective lens, said secondary beam of light being partly deflected by said light deflecting surface portions to pass through said objective lens so that the same projects an image of said light deflecting surface portions, said primary and secondary beams being provided in the absence of diffused illumination.

3. Apparatus for optically projecting images of photographic records and the like carried on transparent supports, which comprises an optical projector having a substantially specular source of light, means for locating the said record in the path of a primary beam of light from said source, an objective lens adapted to project an image of said record while undesired light deflecting surface portions of said record deflect said primary beam of light so that no image of said light deflecting surface portions is projected by said objective lens, a plurality of similarly inclined mirrors arranged annularly of the axis of the primary beam, each providing, by reflection of said substantially specular source of light, a secondary beam of light having a direction to illuminate said record but not to pass through the objective lens, said secondary beam of light being partly deflected by said light deflecting surface portions to pass through said objective lens so that the same projects an image of said light deflecting surface portions, the said apparatus including elements for forming a photographic record of the projected image, said primary and secondary beams being provided in the absence of diffused illumination.

4. A method for producing a blemish-free image from a transparent photographic record having undesired light deflecting surface portions, comprising the steps of projecting a specular beam of light through the transparent record toward an objective lens so that said objective lens produces an incomplete image of said transparent record since said light deflecting surface portions deflect part of said primary specular beam away from said objective lens; and projecting at least one secondary specular beam of light at a selected angle through said transparent record and in a direction to bypass said objective lens, said angle being selected so that said secondary specular beam of light is deflected by said light deflecting surface portions to fall onto said objective lens so that the same forms an image of said light deflecting surface portions completing said image of said transparent record, said primary and secondary beams being provided in the absence of diffused illumination.

5. Apparatus for optically projecting an image of a transparent photographic record having undesired light deflecting surface portions, comprising, in combination, means for supporting said record; an objective lens; means for supporting material on which an image of said record is to be formed; means for projecting a primary specular beam of light through said record to said objective lens whereby said objective lens projects an image of said record onto said material while the light deflecting surface portions of said record deflect part of said primary specular beam of light away from the objective lens so that no image of said light deflecting portions is projected onto said material by said objective lens; and means for projecting at least one secondary specular beam of light through said record in a direction to bypass said objective lens so that part of said secondary beam of light is deflected by said light deflecting portions to pass through said objective lens whereby the same projects an image of said light deflecting portions onto said material, said primary and secondary beams being provided in the absence of diffused illumination.

References Cited in the file of this patent

UNITED STATES PATENTS

| | | |
|---|---|---|
| 1,097,211 | Bechstein | May 19, 1914 |
| 1,163,192 | Adams | Dec. 7, 1915 |
| 1,675,783 | Beal | July 3, 1928 |
| 1,864,696 | Steele | June 28, 1932 |
| 2,083,820 | Bissell | June 15, 1937 |
| 2,338,671 | Shull | Jan. 4, 1944 |

OTHER REFERENCES

"Photography, Principles and Practices," by Neblette, 3rd edition, 1938, pages 421 and 422. (Copy in Div. 7, U.S. Patent Office.)